United States Patent [19]

Casmira

[11] Patent Number: 5,042,430
[45] Date of Patent: Aug. 27, 1991

[54] LITTER COLLECTION APPARATUS AND METHOD

[76] Inventor: Stephen Casmira, 488 Summer St., New Bedford, Mass. 02740

[21] Appl. No.: 549,735

[22] Filed: Jul. 9, 1990

[51] Int. Cl.⁵ .............................................. A01K 67/00
[52] U.S. Cl. ...................................... 119/165; 119/161
[58] Field of Search ................. 119/161, 165, 166, 170

[56] References Cited

U.S. PATENT DOCUMENTS 2,390,854 12/1945 Thompson ........................... 119/161
3,735,735 5/1973 Noroian ............................... 119/165

FOREIGN PATENT DOCUMENTS 898086 4/1972 Canada ................................ 119/166

Primary Examiner—John G. Weiss
Assistant Examiner—R. Thomas Price
Attorney, Agent, or Firm—Thomas A. Kahrl

[57] ABSTRACT

A litter collection apparatus in combination with a litter container and method for collecting litter material employing the litter collection apparatus including a tray for attachment to the litter container including a hopper body having inclined walls defining a base within the hopper body to receive litter material, the tray being characterized by an opening for receiving litter material provided with a grate adapted to permit litter material to drop downwardly and inwardly in the hopper body and to provide animal access, the tray being attached to the hopper body by brackets adapted for manual movement to tilt the hopper body between a litter receiving position and to a litter discharging position, and a method for collecting litter material dropped by an animal including providing litter material in a container, attaching a collecting tray to the container characterized with an opening and provided with a grate for providing a platform for animals and for passing litter material into the collecting tray, the collecting tray being positioned adjacent the container and extending outwardly to provide a platform for use by animals.

10 Claims, 2 Drawing Sheets

LITTER COLLECTION APPARATUS AND METHOD

BACKGROUND OF THE INVENTION

Litter boxes containing litter material such as "kitty litter" traditionally have been used for collecting animal wastes deposited therein by pets, typically cats, confined indoors in dwellings. In the course of utilizing litter boxes for the intended purpose, a cat, by nature displaces the litter material in a way that scatters material causing some of the material to spill out of the litter box onto the adjacent floor or rug thereby causing a mess. Furthermore, loose particles of litter material often temporarily cling to the paws of the cat, as a consequence of using the litter container, typically litter boxes which particles disengage on the animals initial departure to drop on the floor of the dwelling upon exiting the box, also adding to the mess.

Prior attempts have been made to reduce the spillage from litter containers by installing a hood on the container such that the cats scratching action does not scatter the material out of the box. While generally effective to reduce scattering, hoods do not catch the particles temporarily adhering to the cat's paws and dropped upon exiting the litter box.

Accordingly, it is therefore desired to provide for a litter collection apparatus to be used in combination with a litter container for collecting the litter particles from the animal's paws and to a method of collecting litter material scattered in the area adjacent the litter container employing the new litter collection apparatus.

SUMMARY OF THE INVENTION

The present invention relates to a litter collection apparatus and to a litter collection apparatus in combination with a litter container apparatus to collect particles of litter dropped from the paws of animals using the litter container apparatus and to a method for collection of litter particles scattered from the litter container apparatus by the use of an animal.

In particular the invention concerns a litter collection apparatus comprising a compact tray for attachment to a litter container apparatus of box-like construction having four side walls, the tray having a grate and a hopper for collecting litter material scattered by the animal using the litter container and a hinged attachment means for attaching the tray adjacent one or more of the side walls of the litter container apparatus. The present invention comprises an improved litter collection apparatus to be attached to a side wall of a litter container apparatus containing litter material to be used by an animal for the elimination of wastes, the litter container apparatus having a plurality of sidewalls, such as angled generally vertical sidewalls, the litter collection apparatus being positioned adjacent one or more of the sidewalls adapted to collect the litter material by gravity action scattered by animals using material provided in the container apparatus.

The litter collection apparatus includes a grate constructed of screen mesh extending horizontally across the top opening provided in a hopper body having a curved bottom surface, a one side and an other side, and end walls which define a space within the hopper body to receive litter material for collection of wastes and subsequent disposal. The tray includes a base surface, a plurality of arms, typically two, and the one side includes hinge members at the outer most extremity of the two arms extending from the one sidewall. The hopper body comprises a pair of upwardly extending angled sides on opposite sidewalls and an upwardly extending angled end walls at each end to funnel litter material downwardly and inwardly into the hopper body. The hopper body is pivotably mounted by hinge means on brackets for attachment to the upper peripheral edge of one or more sidewalls of the container apparatus having a arcuate upper peripheral edge.

In particular, the invention concerns a litter collection apparatus comprising a compact tray for attachment to a litter container having a grate and a collection hopper for collecting litter material scattered by an animal using the litter container.

The invention is directed to a unique litter collection apparatus comprising a tray member adapted to be used in combination with a litter container, typically a pet litter box, having two walls and two ends, preferably slanting downwardly and inwardly, each wall and end having an upper horizontally extending lateral edge preferably having a rounded periphery, and a flat bottom to define a volume within the container to receive a quantity of litter material for use by animals for the elimination of waste.

Inasmuch as the container includes a plurality of walls having lateral edges provided on the top of the walls the container typically provides one or more access platforms for entrance and exit by the animal depending upon the position of the container either against the wall or in an open space.

The tray member is adapted to be attached to the lateral edges by movable attachment means such that the tray apparatus extends horizontally outwardly from the walls being positioned adjacent to the walls.

The tray apparatus comprises a frame surrounding an elongated opening of generally rectangular shape which is spaced from and extends along a lateral edge, a collection pan attached to the frame and positioned below the frame, a grate means positioned on top of the collection pan having a mesh construction providing a plurality of openings to permit litter material carried on the paws of an animal to drop through the grate into the collection pan, the grate means being attached along its outer edge to the frame. Attachment means preferably a pair of curved hooks are positioned in spaced relationship are attached to the inner edge of the frame for connecting the tray apparatus to an end wall or bottom or side wall of the container.

A gravity method for the collection of litter material such as litter contained in a litter box for pets, so as to remove particles of litter from the paws of pets upon exit from the litter container and for collection of litter scattered out of the litter container box during use thereof by the intended animal which comprises; introducing litter material into a container having a plurality of walls, the litter consisting of a plurality of litter particles; attaching a collecting tray on a wall of the container for use by the intended animal for entrance and exit from the container after use, collecting the litter particles scattered by the animal during use and dropped from the animal's paws after use upon exit. The method also employs a collecting tray having movable hinge detachments on the wall of the container for manually moving the tray from a generally horizontal position to a vertical position for emptying the collected litter material to be returned by gravity into the container thereby cleaning the tray.

The tray apparatus is designed to be attached to one or more of the end walls or side walls used by the animal as an entrance or exit to the litter container. In the preferred embodiment the attachment means comprises a pair of arcuate hooks each having a shaft section and a base including an inwardly extending projection for abutting the slanting sidewalls or end walls of a litter container to position the tray apparatus in a generally horizontal position with respect to the litter container and parallel relationship with the bottom of the container and to permit rotation responsive to manual operation upwardly and inwardly between a horizontal receiving position and a vertical emptying position of the tray apparatus through an arc of 90 degrees. In the emptying operation the litter previously contained in the hopper through traffic by animals using the box is directed downwardly and outwardly through the openings in the grate to return to the base of the container where other litter material is present.

In an alternate embodiment preferably a brace support is provided on the attachment means for securely supporting the tray apparatus in an outwardly extending horizontal position and for supporting the weight of a pet when standing or stepping on it the tray apparatus is securely attached to the litter container in a manner which does not permit manual tilting. Furthermore, connection means are provided for connecting a plurality of tray apparatuses attached to adjacent side or end walls of the container.

The litter tray apparatus of the invention may be of molded hard composite plastic material and the grate of a metallic wire mesh. The litter tray apparatus of the invention is a compact, simple, effective, relatively inexpensive apparatus for collecting litter scattered from a litter container through use by animals.

The invention will be described for the purposes of illustration only in connection with certain embodiments., however, it is recognized that those persons skilled in the art may make various changes, modifications, improvements and additions on the illustrated embodiments all without departing from the spirit and scope of the invention.

DESCRIPTION OF THE EMBODIMENTS

Figure 1:
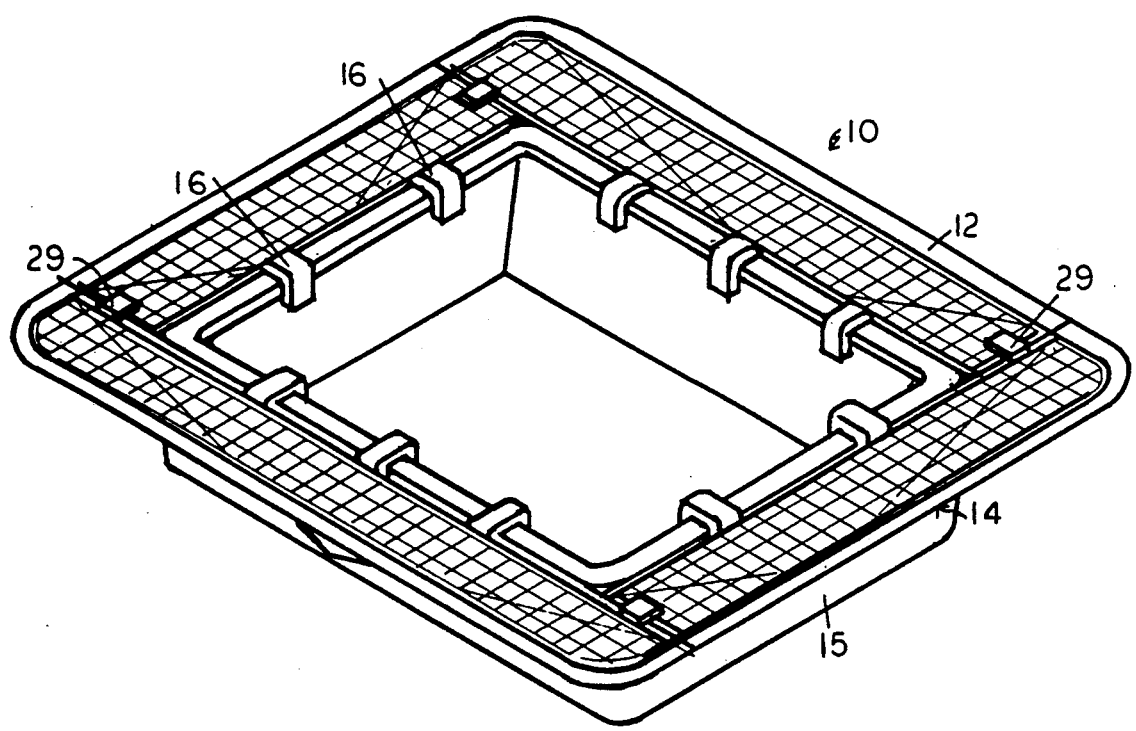
FIG. 1 is an elevational view of a litter collection apparatus embodying the present invention shown attached to a litter container apparatus shown without litter material.
Figure 2:
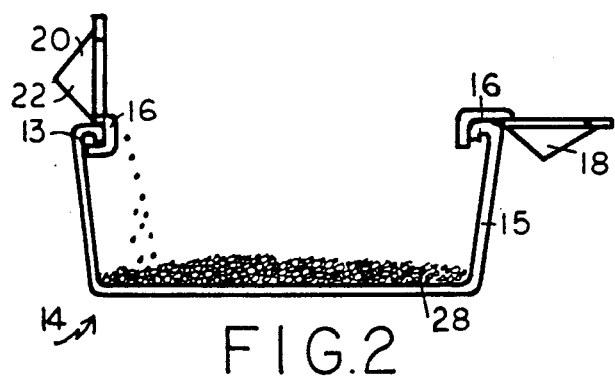
FIG. 2 is a side crosssectional view of the improved litter collection apparatus of the invention as employed in FIG. 1 showing a tray in the extended litter collection position on the right and on a tilted litter discharge position on the left.
Figure 3:
FIG. 3 is an end view of the improved litter collection apparatus of the invention.
Figure 4:
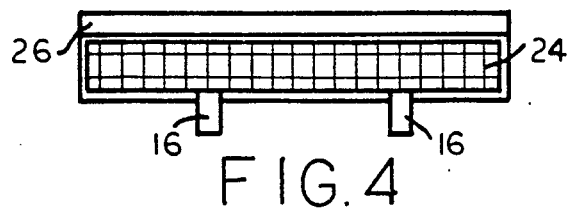
FIG. 4 is a top plan view of the improved litter collection apparatus of the invention.
Figure 5:
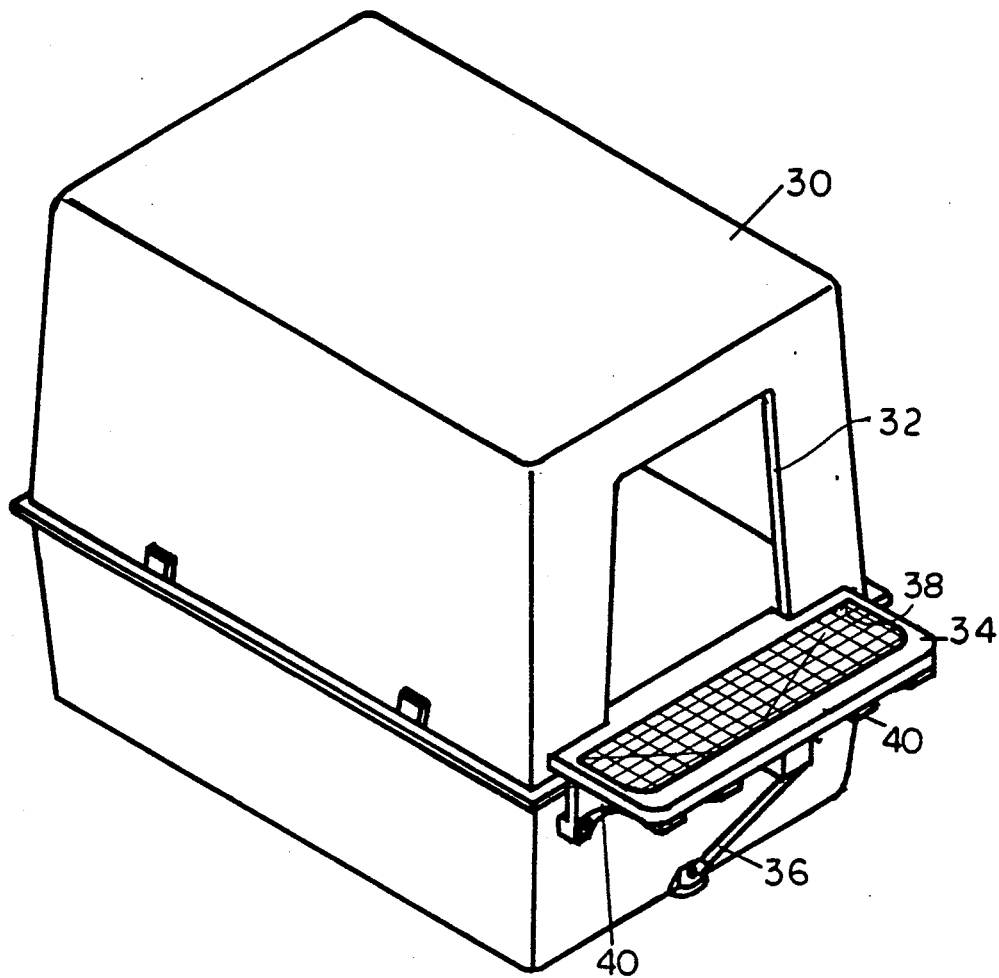
FIG. 5 is a elevational view of the litter collection apparatus embodying the present invention shown attached to a covered litter container apparatus.
Figure 6:
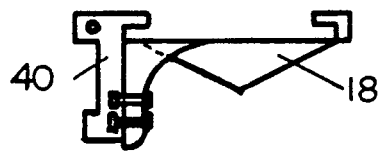
FIG. 6 is a crosssectional side view of the litter collection apparatus of the invention shown as employed in FIG. 6 with a fixed attachment device.

With reference to the drawings, FIGS. 1 and 2 show in combination a litter collection apparatus and a litter container apparatus 10 including a litter collection apparatus 12 and a litter container 14, illustrated as a Kitty Litter Box. The litter collecting apparatus 12 is positioned adjacent the litter container apparatus 14 being attached to wall 15 at the top curve peripheral edge 13 by a pair of curved hooks 16 and comprises a hopper body 18 including a curved bottom surface and a pair of sidewalls 20 and 22 with outwardly extending angled sides. As shown in FIGS. 1 and 4 the hopper is provided with a screen 24 of coarse mesh extending across the opening 26. As shown in FIG. 2 litter material 28 is introduced into the container 14 for subsequent use by an animal. Connectors 29 are provided at the end of the trays for connecting adjacent trays.

In another embodiment, the litter container 10 is provided with a hood 30 having a access door 32 with a unitary fixed tray 34 with a brace support 36 and a screen 38 and a pair of fixed brackets 40.

What is claimed is:

1. A litter collection apparatus for use with an animal litter container and adapted to collect litter material which litter collection apparatus comprises;
    a) a tray for attachment to the animal litter container comprising;
        i) a hopper body having a one side and an other side;
        ii) a top surface; and
        ii) a plurality of walls to define a space within the hopper body to receive litter material;
    b) the top surface is characterized by an opening extending substantially across the width of the hopper body to permit litter material to pass downwardly through the opening into the hopper body;
    c) a bracket means for mounting the tray on one side of the animal litter container apparatus to permit tilting of the tray about an axis between a generally horizontal litter material collecting position adjacent the litter container, and an upwardly angled litter material discharging position for returning the litter material by gravity to the litter container;
    d) a grate means positioned on the top surface for providing animal access for stepping in and out of the litter container having mesh openings for permitting particles dropped from the animals paws to enter the hopper body whereby, when the animal steps on the grate means exiting the animal litter container, the litter material carried on the paws of the animal are permitted to drop through the grate means into the hopper body of the tray for retention therein and subsequent removal.

2. The litter collection apparatus of claim 1 wherein the bracket means comprises a pair of arcuate hooks, each with a shaft section and a base having an inwardly extending projection for abutting the walls of the litter container to position the tray apparatus in a generally horizontal position in parallel relationship with the bottom of the box and to permit rotation upwardly and inwardly between a horizontal receiving position and a vertical emptying position of the tray through an arc of 90 degrees.

3. The litter collection apparatus of claim 1 wherein the tray is attached by the bracket means to the sidewalls which are generally slanting upwardly and outwardly which provide access platforms to and from the litter container.

4. The litter collection apparatus of claim 1 wherein the plurality of walls provide a plurality of access platforms for entrance and exit to and from the container by animals using the litter.

5. The litter collection apparatus of claim 1 wherein the apparatus includes a brace support means for securely supporting the tray in an outwardly extending horizontal position and for supporting the weight of an animal when standing or stepping on the tray.

6. The litter collection apparatus of claim 1 which includes connecting means for connecting a plurality of trays and comprising a first and second tray positioned at right angles and attached to the adjacent sidewalls of the container for providing a continuous tray extending around the four lateral edges of the litter container.

7. A litter collection apparatus for use with an animal litter container apparatus having a plurality of walls with a continuous lateral edge which litter collection apparatus comprises;
 a) a tray extending outwardly adjacent to the lateral edge surrounding an elongated opening of generally rectangular shape for attachment to the animal litter container comprising;
  i) a hopper body having a one side and an other side for collecting litter material having a plurality of sloping sides extending outwardly to form a frame;
  ii) a top surface; and
  iii) a plurality of walls to define a space with the hopper body to receive litter material;
 b) the top surface is characterized by an opening extending substantially across the width of the hopper body to permit litter material to pass downwardly through the opening into the hopper body;
 c) attachment means for attaching the tray to the lateral edge of a wall of the animal litter container;
 d) a grate means positioned on top of the hopper body extending across the opening and fastened to the lateral edge of the frame having a mesh construction providing a plurality of openings whereby when the animal steps on the grate means exiting the container, litter material carried on the paws of the animal having just used the litter box and exiting the box via the tray, are permitted to drop through the grate means into the hopper for retention therein and subsequent removal.

8. A method of collecting litter material scattered from a litter container which method comprises;
 a) introducing litter material consisting of as plurality of litter particles into the container having a plurality of sidewalls;
 b) attaching a collecting tray to one or more of the sidewalls of the container, the collecting tray being characterized by an opening with a grate for passing litter material, the collecting tray being positioned adjacent to the container and extending outwardly to provide an access platform for use by animals;
 c) manually tilting the collecting tray containing litter material previously collected to an inclined litter discharging position so that on movement between the litter collecting position and the inclined litter discharging position, the litter material is returned to the container;
 d) positioning the litter container such that an animal makes use of the access platform to gain access to the material in the box and to exit from the litter box;

9. The method of claim 8 wherein the litter collecting apparatus is adapted to collect litter material scattered by the animal using the litter container and to collect litter particles dropped from the animals paws upon exiting the container via the access platform provided by the collecting tray after use.

10. The method of claim 8 wherein upon the litter collecting apparatus is cleaned by manual tilting without removal from the container walls.

* * * * *